(12) United States Patent
Schmidt et al.

(10) Patent No.: US 7,091,432 B2
(45) Date of Patent: Aug. 15, 2006

(54) POWER CIRCUIT BREAKER

(75) Inventors: Detlev Schmidt, Berlin (DE); Günter Seidler, Berlin (DE); Ingo Thiede, Berlin (DE); Sezai Türkmen, Berlin (DE); Artur Wajnberg, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/533,222

(22) PCT Filed: Aug. 28, 2003

(86) PCT No.: PCT/DE03/02885

§ 371 (c)(1),
(2), (4) Date: Apr. 29, 2005

(87) PCT Pub. No.: WO2004/040727

PCT Pub. Date: May 13, 2004

(65) Prior Publication Data

US 2006/0049025 A1 Mar. 9, 2006

(30) Foreign Application Priority Data

Oct. 30, 2002 (DE) ................................ 102 51 002

(51) Int. Cl.
*H01H 9/20* (2006.01)
(52) U.S. Cl. ...................... 200/50.24; 200/50.21
(58) Field of Classification Search .. 200/50.21–50.27, 200/605–610, 615
See application file for complete search history.

(56) References Cited

U.S. PATENT DOCUMENTS

| | | | | |
|---|---|---|---|---|
| 3,188,412 A | * | 6/1965 | Netzel | 200/50.24 |
| 3,309,473 A | * | 3/1967 | Wilson | 200/50.24 |
| 3,578,925 A | * | 5/1971 | Drown et al. | 200/50.24 |
| 3,663,773 A | * | 5/1972 | Powell | 200/50.24 |
| 4,017,698 A | * | 4/1977 | Kuhn et al. | 200/50.21 |
| 4,154,993 A | * | 5/1979 | Kumbera et al. | 200/50.24 |
| 4,396,813 A | * | 8/1983 | Hesselbart et al. | 200/50.21 |
| 4,464,703 A | * | 8/1984 | Davies et al. | 361/614 |
| 4,703,137 A | * | 10/1987 | Bohnen et al. | 200/50.25 |
| 4,728,757 A | * | 3/1988 | Buxton et al. | 200/50.21 |
| 4,814,942 A | * | 3/1989 | Robirds et al. | 361/607 |
| 5,895,898 A | * | 4/1999 | Godesa | 200/50.32 |
| 6,486,421 B1 | * | 11/2002 | Jones et al. | 200/50.32 |

FOREIGN PATENT DOCUMENTS

| | | |
|---|---|---|
| DE | 74 38 652 U | 3/1975 |
| DE | 30 15 259 A | 10/1981 |
| DE | 30 15 259 A1 | 10/1981 |
| DE | 196 47 747 C1 | 4/1998 |
| EP | 0 886 355 A2 | 12/1998 |
| EP | 0886 355 A | 12/1998 |

* cited by examiner

*Primary Examiner*—Michael Friedhofer
*Assistant Examiner*—Lisa Klaus
(74) *Attorney, Agent, or Firm*—Harness, Dickey & Pierce, P.L.C.

(57) ABSTRACT

A power circuit breaker includes an insertion rack which is arranged in a distribution unit and a lock system for locking the power circuit breaker in the insertion rack in a locking system. The locking system can be actuated by a drive mechanism, in particular by the switch shaft of the power circuit breaker.

17 Claims, 2 Drawing Sheets

POWER CIRCUIT BREAKER

This application is the national phase under 35 U.S.C. § 371 of PCT International Application No. PCT/DE2003/002885 which has an International filing date of Aug. 28, 2003, which designated the United States of America and which claims priority on German Patent Application number DE 102 51 002.4 filed Oct. 30, 2002, the entire contents of which are hereby incorporated herein by reference.

FIELD OF THE INVENTION

The invention generally relates to a power circuit breaker having a withdrawable-part rack. In one example, it relates to one which can be arranged in a switchgear assembly by use of the withdrawable-part rack.

BACKGROUND OF THE INVENTION

Power circuit breakers of the generic type are known. By arranging them in their withdrawable-part rack, they can be inserted or withdrawn in or from a switchgear assembly in a simple manner. In this case, significant importance is given to locking the power circuit breaker in its withdrawable-part rack.

In particular in the case of power circuit breakers having a high short-circuit disconnection capacity, a force occurs, owing to the loop effect of the current path of the power circuit breaker or of the switchgear assembly, which acts on the power circuit breaker. This force is directed such that the power circuit breaker is forced out of its withdrawable-part rack.

In particular in the case of high flowing currents (short-circuit currents), considerable forces acting on the power circuit breaker occur since the force acting rises with the square of the current. If in this case the power circuit breaker is not fixed in its withdrawable-part rack precisely in the line of action of this force, the power circuit breaker may be subjected to a torque owing to leverage. The result is that the power circuit breaker experiences a tipping movement which leads to a relative movement between the connection pieces of the switching contacts of the power circuit breaker and the contact laminations of the withdrawable-part rack.

This relative movement may lead to a separation of the switching contacts from the contact laminations, with the result that arc formation cannot be ruled out. As a result of the high flowing currents, destruction of the power circuit breaker would be associated with this.

It is known to latch the power circuit breaker with its withdrawable-part rack by way of a latching device. In this case, retaining systems are known which are actuated by an insertion shaft or an insertion drive for the purpose of inserting the power circuit breaker in the withdrawable-part rack. Such retaining systems, however, are typically of a complex design. Furthermore, a minimum amount of play is provided between the restraining elements of the retaining system and the withdrawable-part rack, since only a simultaneous movement between the power circuit breaker and the withdrawable-part rack and lifting-out of the restraining systems is possible.

In addition, rigid systems are known, by which the insertion direction or the withdrawal direction of the power circuit breaker in or out of the withdrawable-part rack can be blocked. These systems have a relatively small, effective lever arm, such that the high forces which occur in particular in the case of a short-circuit cannot reliably be absorbed.

DE 196 47 747 C1 discloses an insertable device carrier having a latching device. In this case, a latching rod is displaced at the same time owing to a rotation of an actuating shaft of a main breaker. The latching rod in turn displaces a blocking slide. The result is that latching of the device carrier takes place.

As a result, single-point latching of the device carrier is achieved such that it is positioned. However, if high forces are acting owing to high currents flowing (short-circuit currents), the latching rod known from DE 196 47 747 C1 forms a lever arm such that a displacement of the device carrier. Accordingly, a power circuit breaker from the desired latched position cannot be ruled out. The point of engagement of the latching rod in a latching opening in a device floor in this case acts as a pivot in order that a deflection of the latching rod can take place.

SUMMARY OF THE INVENTION

An embodiment of the invention includes an object of creating a power circuit breaker which can be latched safely in its withdrawable-part rack by way of a simple arrangement.

According to an embodiment of the invention, an object may be achieved by a power circuit breaker. As a result of the fact that the latching device of the power circuit breaker can be operated by a switching drive, in particular by a switching shaft of the power circuit breaker, it is advantageously possible to link the closure of the switching contacts of the power circuit breaker with the latching of the power circuit breaker in the withdrawable-part rack. This operative connection, which is thus almost provided, between the closed switching contacts of the power circuit breaker and the latching of the power circuit breaker in the withdrawable-part rack makes it possible to apply a restraining force on the power circuit breaker which is matched to the switching position of the power circuit breaker, and which holds the power circuit breaker securely in the desired position, even in the event of high currents flowing.

In particular, a situation is prevented in which the forces injected by the high currents force the connection pieces of the switching contacts and the contact laminations of the withdrawable-part rack apart from one another. The result is that the arc formation mentioned initially can be suppressed.

In one preferred refinement of an embodiment of the invention, provision is made for the switching shaft to include at least one actuating element. This element is connected to the switching shaft such that it is fixed against rotation and by which the latching device can be brought into the latched position or the unlatched position. As a result, the actuation of the latching device is possible in a particularly simple manner.

The switching shaft of the power circuit breaker in this case bears a gear or gear segment, which is arranged such that it is fixed against rotation, preferably outside of an exterior limiting structure. As a result, it is possible in a particularly simple manner to couple the switching movement of the contact arrangement to the actuation of the latching device. The switching shaft undergoes a rotary movement, which is at the same time used to actuate the latching device, for connection, i.e. for the purpose of closing the switching contacts, or for disconnection, i.e. for the purpose of opening the switching contacts, of the power circuit breaker.

In particular if, in one further example refinement of an embodiment of the invention, the axially displaceable latching bolts have a toothed rod section which meshes with the actuating element. The rotary movement of the switching shaft can easily be converted into a lifting movement of the latching bolts. It is thus possible to lock the power circuit breaker in a reliable manner.

In accordance with further refinements of embodiments of the invention, the actuating element can be operatively connected to the latching bolt via a crank arrangement, open or closed cam disks, cable pulls, Bowden cables or the like. Irrespective of the specific design of this operative connection, the rotary movement of the switching shaft can be transferred in a simple manner to the latching movement or unlatching movement of the latching device.

Embodiments include a robust design requiring little or no maintenance. As a result, they are particularly suitable for being used in power circuit breakers which are subjected to relatively robust operating conditions.

BRIEF DESCRIPTION OF THE DRAWINGS

Further advantages, features and details of the invention will become evident from the description of illustrated example embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
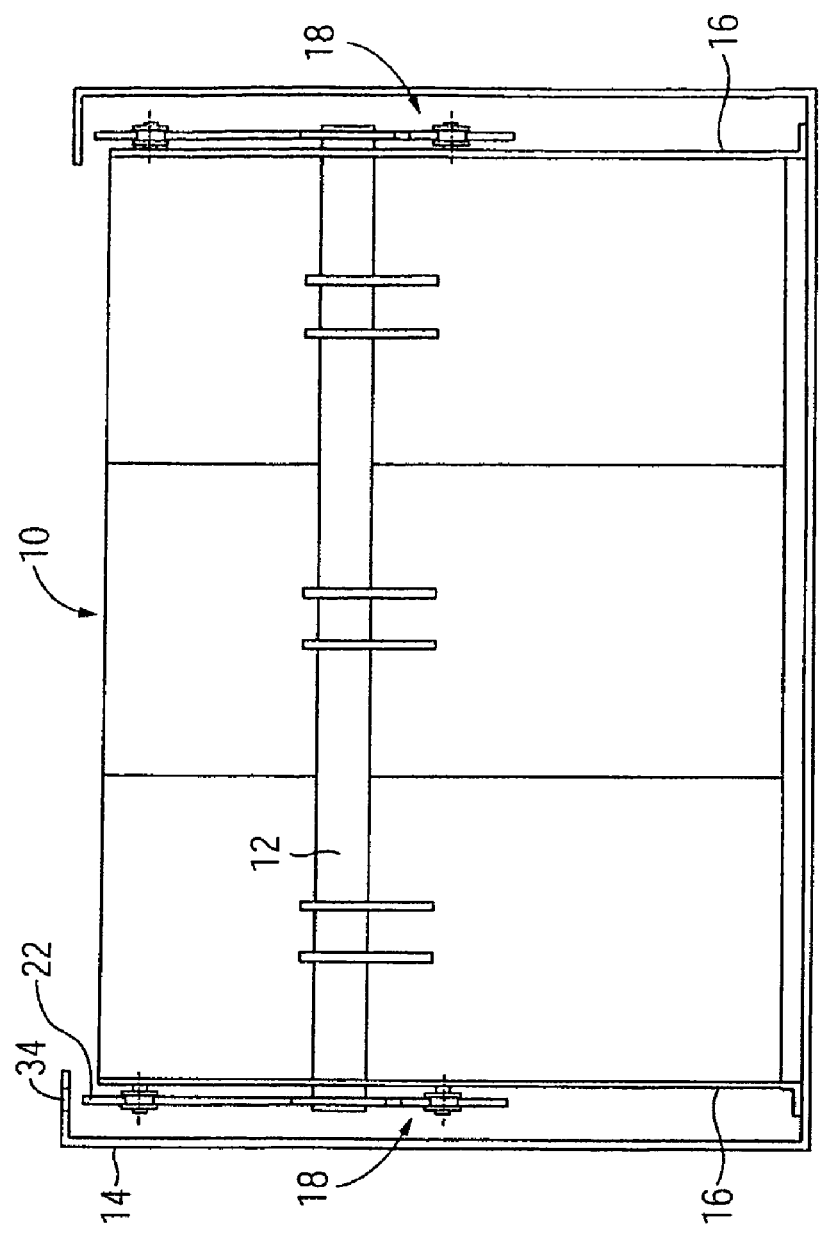
FIG. 1 shows a schematic view of a power circuit breaker.

FIG. 1 shows a schematic illustration of a power circuit breaker 10, for reasons of clarity details being omitted from the illustration. In accordance with the illustration, the power circuit breaker is, for example, a three-pole power breaker.

The power circuit breaker 10 includes a switching shaft 12, by which movable switching contacts of the power circuit breaker 10 can be guided towards fixed switching contacts (closed position) or away from the switching contacts (open position). For this purpose, the switching shaft 12 can be rotated about its longitudinal axis in a corresponding angular range by a drive arrangement (not shown).

The power circuit breaker 10 can be arranged in a switchgear assembly (not shown) by way of a withdrawable-part rack 14 which is merely indicated.

The switching shaft 12 is extended beyond lateral structural elements 16, for example retaining and accommodating frames, and bears there, on both sides, a latching device which is given the overall designation 18. The design and operation of the latching device 18 will be explained in more detail with reference to FIG. 2.

The latching device 18 includes an actuating element 20, which is arranged such that it is fixed against rotation on the switching shaft 12 and which interacts with a latching bolt 22. The latching bolt 22 is arranged such that it can be displaced axially and is guided, for example by means of guide rollers 24.

The actuating element 20 is formed by a gear segment 26, which has an associated toothed rod section 28 of the latching bolt 22. The gear segment 26 and toothed rod section 28 are in meshing engagement with each other.

Figure 2:
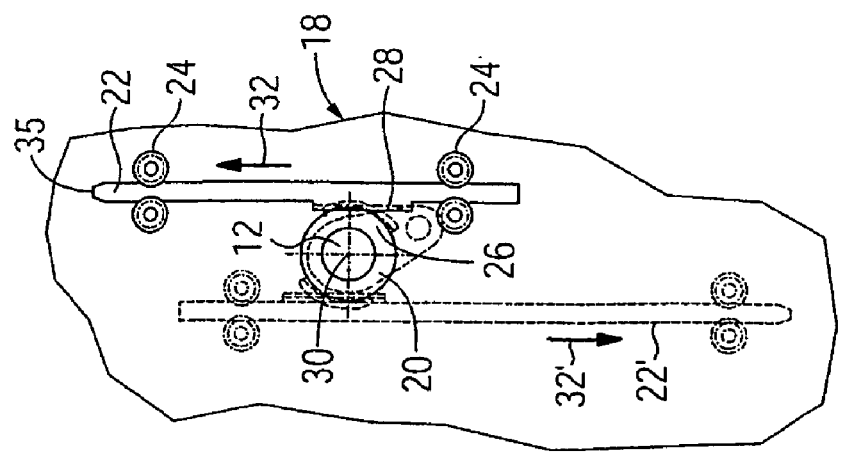
FIG. 2 shows a schematic plan view of a first embodiment of a latching device of the power circuit breaker.

The latching device 18 illustrated in FIGS. 1 and 2 has the following operation:

When the switching shaft 12 is actuated for the purpose of closing the switching contacts of the power circuit breaker 10, the switching shaft is rotated about its axis of rotation 30, as shown in the illustration in FIG. 2 in the counterclockwise direction. As a result, the actuating element 20, which is connected to the switching shaft 12 such that it is fixed against rotation, experiences an identical rotary movement. As a result of the fact that the actuating element 20 meshes with the latching bolt 22, the latching bolt 22 experiences a lifting movement which is directed in the direction of the arrow 32.

As a result, the latching bolt 22 engages in a corresponding opening 34 in the withdrawable-part rack 14. For the purpose of inserting the latching bolt 22 precisely in the opening 34, the latching bolt 22 may have a conical tip 35.

It becomes apparent that the switching movement of the power circuit breaker 10 may be transferred in a simple manner to the actuation of the latching device 18 via the switching shaft 12. Thus, when the power circuit breaker 10 is connected, the latching device 18 may be automatically moved over into the latched position. The power circuit breaker 10 is thus in any case secure during its connected state.

In this case, a controlled movement of the latching device 18 takes place such that it is already latched before primary arcing contact of the power circuit breaker 10 is effective. This ensures that the locking has already reliably taken place even in this connected state of the power circuit breaker 10.

Unlatching of the latching device 18 takes place in analogous fashion by opening the power circuit breaker 10. In this case, in turn the switching shaft 12 experiences an opposite rotary movement about the axis of rotation 30, in accordance with the illustration in FIG. 2), in the clockwise direction. The correspondingly resulting rotary movement of the actuating element 20 is transferred to the latching bolt 22, with the result that the latching bolt 22 is lowered in opposition to the lifting movement 32, with the result that the latching bolt 22 is moved out of engagement with the opening 34.

As indicated in FIG. 2, the actuating element 20 has associated with it a further latching bolt 22' which is arranged diametrically opposite the latching bolt 22. The design and operation of the latching bolt 22' corresponds to those of the latching bolt 22. Owing to the diametrically opposite arrangement, in the case of a lifting movement 32 of the latching bolt 22, the latching bolt 22' experiences a lifting movement 32' in the opposite direction. This makes it possible at the same time to latch the power circuit breaker 10 both in an upper section and in a lower section of the withdrawable-part rack 14.

In the case of two latching devices 18 being provided, there is thus a total of four latching points. These latching points ensure secure positioning of the power circuit breaker 10 in its withdrawable-part rack which takes place even in the event of high currents and which is resistant to the action of high forces. Relative movements of connection pieces (not illustrated in any more detail) of the switching contacts and contact laminations of the withdrawable-part rack in relation to one another can thus be prevented.

Figure 3:
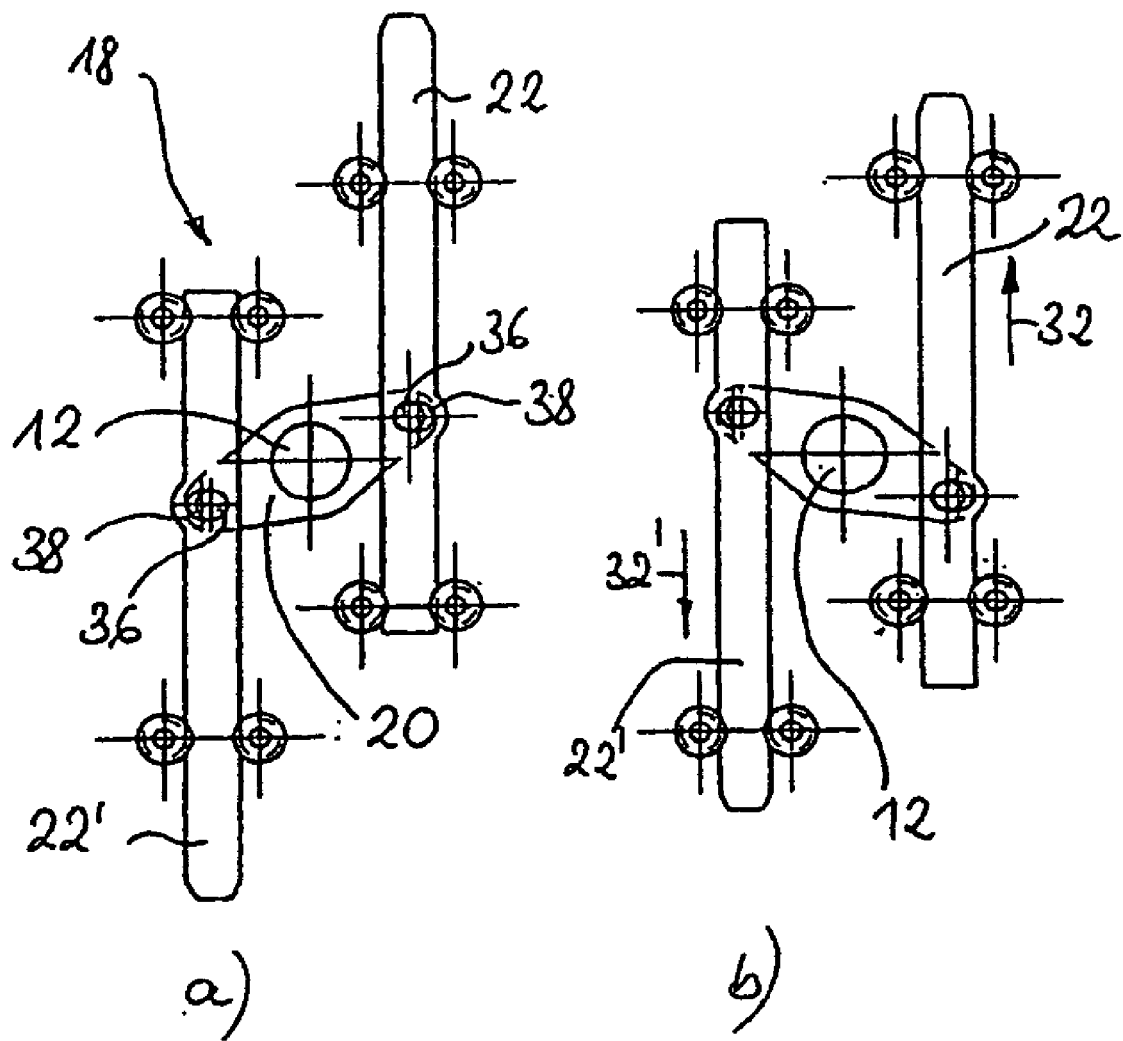
FIG. 3 shows a second embodiment of a latching device.

FIG. 3 shows a modified embodiment of the latching device 18. In this case, FIG. 3a shows the unlatched position, and FIG. 3b shows the latched position. Identical parts to those in the preceding figures are provided with identical reference numerals and will not be explained again.

In contrast to the exemplary embodiment shown in FIGS. 1 and 2, the actuating element 20 is in this case in the form of a crank arrangement 36, which interacts with a corresponding link guide 38 of the latching bolts 22 and 22', respectively. This also makes it possible, in a simple manner, for the rotary movement of the switching shaft 12 to be converted into the lifting movement 32 of the latching bolts 22 and 22'.

The actuating element 20 has associated with it two diametrically opposite latching bolts 22 and 22', respectively. Here too, an actuating element 20, in the form of a twin-crank arrangement, interacts with link guides 38 of the in this case two latching bolts 22 and 22'.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A power circuit breaker, comprising:
    a withdrawable-part rack, arrangable in a switchgear assembly; and
    a latching device, adapted to latch the power circuit breaker in the withdrawable-part rack in a latched position, the latching device being actuatable by a switching shaft of the power circuit breaker, the latching device including two latching bolts, displaceable essentially axially in opposing directions of action and into interlocking connection with the withdrawable-part rack.

2. The power circuit breaker as claimed in claim 1, wherein the latching device includes at least one actuating element, connected to the switching shaft of the power circuit breaker such that it is fixed against rotation, for bringing the latching device into at least one of the latched position and the unlatched position.

3. The power circuit breaker as claimed in claim 2, wherein the actuating element includes at least one of a gear and a gear segment which meshes with a toothed rod section of the latching bolts.

4. The power circuit breaker as claimed in claim 2, wherein the actuating element includes a crank arrangement, in engagement with a link guide of the latching bolts.

5. The power circuit breaker as claimed in claim 2, wherein the actuating element is connected to the latching bolt via at least one of open and closed cam disks.

6. The power circuit breaker as claimed in claim 2, wherein the actuating element is connected to the latching bolts by at least one of a cable pull and a Bowden cable.

7. The power circuit breaker as claimed in claim 1, wherein the latched position of the latching device is reached before primary arcing contact of the power circuit breaker is effective.

8. The power circuit breaker as claimed in claim 2, wherein the latched position of the latching device is reached before primary arcing contact of the power circuit breaker is effective.

9. The power circuit breaker as claimed in claim 3, wherein the latched position of the latching device is reached before primary arcing contact of the power circuit breaker is effective.

10. The power circuit breaker as claimed in claim 4, wherein the latched position of the latching device is reached before primary arcing contact of the power circuit breaker is effective.

11. The power circuit breaker as claimed in claim 5, wherein the latched position of the latching device is reached before primary arcing contact of the power circuit breaker is effective.

12. The power circuit breaker as claimed in claim 6, wherein the latched position of the latching device is reached before primary arcing contact of the power circuit breaker is effective.

13. A power circuit breaker, comprising:
    a withdrawable-part rack, arrangable in a switchgear assembly; and latching means for latching the power circuit breaker in the withdrawable-part rack in a latched position, the latching means being actuatable by a switching shaft of the power circuit breaker, the latching means including two latching bolts, displaceable essentially axially in opposing directions of action and into interlocking connection with the withdrawable-part rack.

14. The power circuit breaker as claimed in claim 13, wherein the latching means includes at least one actuating means, connected to the switching shaft of the power circuit breaker such that it is fixed against rotation, for bringing the latching means into at least one of the latched position and the unlatched position.

15. The power circuit breaker as claimed in claim 14, wherein the actuating means includes at least one of a gear and a gear segment which meshes with a toothed rod section of the latching bolts.

16. The power circuit breaker as claimed in claim 14, wherein the actuating means includes a crank arrangement, in engagement with a link guide of the latching bolts.

17. The power circuit breaker as claimed in claim 14, wherein the actuating means is connected to the latching bolt via at least one of open and closed cam disks.

* * * * *